UNITED STATES PATENT OFFICE 2,014,609

PEST ANNIHILATOR

George Boyd Barnhill, Oakland, Calif.

No Drawing. Application February 1, 1932,
Serial No. 590,316

11 Claims. (Cl. 167—14)

Various adsorbent materials are used in the fining of different types of oils, such as, mineral oil, animal oil, fish oil, and vegetable oil, the fining processes being known as filtering, bleaching, decolorizing, clarifying, deodorizing, deacidizing, etc., these processes generally being of the nature of contact processes. The adsorbent materials used in these fining processes frequently comprise what are known as English fuller's earth, Georgia clay from Pike's Peak, Georgia, clays from Nevada, clays from Death Valley in Nevada and California, fuller's earth, bentonite, floridine earth, and they may also use magnesium and other silicates, silicas, bone char, and various types of activated carbons, and they are frequently used either alone or in suitable admixture with each other, an example of such admixture being a thirty percent addition of an activated carbon to any suitable one of the inorganic adsorbents above referred to.

The various adsorbents used for the fining of the various oils are frequently revivified or reactivated after use so that they may be used again and again, but such adsorbent finally, that is either after its first use or after some later use for fining, loses its fining properties to such a degree that it is, therefore, no longer economical or desirable to attempt to use it further. The adsorbent material at this stage is known as "foots" and ordinarily is a waste product containing oil.

My invention not only has for its object the application of such waste products to useful purposes, but it also comprises the improvement of pest annihilators, to impart to them various novel and useful characteristics, as will appear from the appended description which will also disclose further objects of the invention.

Broadly, my invention comprises compositions of matter for use as pest annihilators, which compositions include oily foots as above described as an ingredient thereof.

The chemical and physical action of liquid oils as a thoracic poison and as a carrier for other materials is known, but the use of the oily foots as proposed by me lends novel characteristics and functions to the pest annihilator, since the oil is in the composition of matter not as a continuous liquid nor in the form of an emulsion, but it is present in dust form and remains so present, and sometimes the oil in the foots acts as a poison per se and sometimes as a carrier for other materials, or both, and the compositions of matter may be so made up that they do not necessarily have any toxic effect on the plants to which they are applied.

For the control of insects, fungi, or other pests on food crops, such as citrous and deciduous fruits, grapes, vegetables, etc., I prefer to use the foots from vegetable oil refineries. Animal oil foots may be used in like manner, such as the foots from animal fat, and the fining of fish oil, such as sardine oil, whale oil, and the oil of many other fishes. Fatty oil foots, that is, foots from the fining of ester oils as distinguished from mineral and hydrocarbon oils, have been found to be non-toxic to growing plants if applied in dry media that will not plug the respiratory systems of such plants, since trees bear fruit practically in direct proportion to their healthful leaf area, and when the oil is distributed according to my invention, over the leaf area in a dry carrier, respiration is not at all retarded.

Ordinarily, the adaptation of any of the features of oil above mentioned to water as a carrier for distribution on the plants involves the use of additional and harmful materials, such, for example, as saponifying agents, acids and spreaders, these generally being toxic per se to the plants even when present in small quantities, and furthermore, oil applied as a liquid to plants plugs up the pores and sap channels.

By the application of the oil as proposed by me, that is, in what may be called a dry state and in a dry medium, the use of caustics, acids, caseinates and other spreaders that are ordinarily used to make the various liquid oils miscible with water may be entirely eliminated.

In the case of grapes, liquid oil in a water carrier will control such pests as the European brown mite, red spider, as well as the various fungi that attack grapes, such, for example, as mildew, zinfandel, smut, Spanish measles, and the like, and in some cases leaf hoppers, yet its cost, its burning effect on the foliage and the destruction of the bloom on the grapes besides thereby prohibits its use. As a result, the cure for these in liquid wet form does more damage to the fruit and foliage than does the disease itself.

I have found that certain vegetable oils, such, for example, as cocoanut oil, cottonseed oil, corn oil and the like, animal and fish oils, and, in fact, almost all of the fatty ester oils when in dry form do not harm the plant and such oils may be in combination with other materials, such as, finely divided sulphur and/or treated earths or other substances which have the capability of eliminating the particular disease in question.

Carbons when used with vegetable oil foots frequently leave in the oil a very persistent black coloring material, and such foots when mixed with sulphur and/or treated earths result in the sulphur volatilizing at a much lower temperature that is, from 10° to 15° F. than it would if the sulphur or other material were applied straight. This seems to be due to the absorption of ultraviolet light rays and to the chemical action between the vegetable oils and the sulphur or other material. In the case of sulphur, pentathyonic gases are formed which are toxic to the insects within a limited area of the spot where they are formed.

The use of my invention or discovery, that is, oil in so-called dry form and in a manner that is non-toxic to the plants, now makes it possible to use oils in many pest annihilator compositions which are novel, for both ground-dusting machines and airplanes. Airplanes are limited to the use of dry materials, but since the oil in my compositions is in a form equivalent to dry, it may be dusted from airplanes, and this is one of the important results of my invention. Because of the mobility of airplanes, it is possible to cover vast areas in a very short time and thus keep ahead of the inroads of the insect and other pests.

Actual tests in the field have shown that by the use of my invention a dry material containing as much as twenty percent of oil can be effectively dusted. This amount of oil is, of course, far beyond the toxic tolerance of many plants, and it thus becomes possible for me to dust a pest annihilator which contains the maximum amount of oil permitted by the toxic tolerance of the plant in question.

Liquid oil sprays have a great many limitations because of the slowness and cost of application. Vegetable oils may not be used in such liquid oil sprays because of their prohibitive cost, but by the use of my invention, vegetable oil foots, which is practically a waste product and which may be obtained at practically no expense, is made useful as a substitute for the too expensive vegetable oils. It was, therefore, necessary previous to my invention or discovery to use petroleum oils instead of vegetable or other fatty ester oils, and also to make such petroleum miscible with water, that is, to get them into some form of emulsion which required costly chemical processes. Petroleum oils, particularly those not well refined or not refined at all, disintegrate into asphaltum or other gummy material, and the repeated use of such petroleum oils year after year on trees and plants thus creates a condition in the soil which is not only highly undesirable but is causing plant pathologists throughout the country much concern.

The plugging of leaf breathing area results in a reduction of the size and quality of the fruit, but this undesirable feature is absent as a result of the use of my invention. Furthermore, the animal and vegetable and, in fact, practically all fatty ester oils disintegrate or decompose into soil stimulants and leave no harmful residue either on the plant or in the soil, but on the contrary they stimulate their growth.

It thus becomes apparent that the use of my invention results in efficient spraying of the material and it also provides a very inexpensive source of oils which do not interfere with plant respiration and which do not produce a bad condition of the soil, but which on the contrary stimulate the soil and the growth of the plant.

In the various fining processes resulting in the foots, the various conditions under which fining is carried out, such as heat, pressure and the like incidental to any one particular process, seems to result in a much better impregnation or saturation of the adsorbent with the oil being fined, and I therefore prefer such materials to those made by casually mixing the oil with the adsorbent.

While it is true that mineral oils are frequently harmful to plant life and for that reason it is frequently undesirable to use mineral oil foots for annihilating pests on plants, yet mineral oil foots may be used in accordance with my invention, and without harmful effects, in compositions intended as a larvacide for mosquito control. In the refining of petroleum, decolorizing clay is frequently used without admixture therewith of any adsorbent carbons, but this is a feature inherent in the oil refining process and irrespective of the presence or absence of such carbons, the adsorbent foots used in petroleum refining are useful in mosquito control. The oil of the mineral oil foots when dusted over water floats on the surface thereof forming an unbroken film, which acts as an agent to smother the mosquito larvæ, and furthermore, it has a very marked toxic property as a thoracic poison, since small particles of oil seem to be inhaled into the breathing tube of the larvæ as they come to the surface for air; and when a small particle of oil or oil bearing dust is thus inhaled, the larva is unable to expel it and suffocates as a result. Furthermore, if a complete film of oil is maintained on the surface of the water and the larva is unable to or does not push his tail through it, such tail containing his breathing tube, the larva inhales water and this also causes suffocation.

The mineral oil may thus be dusted from an aiplane or other device in such a form that it has the dusting qualities of a dry powder, and the mineral oil foots may thus be used alone or in combination with other materials having larvacidal properties, some of which, for example, are arsenic and the various salts thereof, carbolic and cresylic acids, various salts of sodium and potassium, as well as many others. The control of mosquitoes by airplanes is thus made practical, and as a result of my invention, vast areas can now be made mosquito-free, which previously could not be so controlled, because they were not accessible with any apparatus moving on land or on water.

The actual oil content of the oil foots frequently varies with the nature of the refining process and with economic conditions, such for example, as the value of the oil refined, and therefore, oil is sometimes sought to be extracted from the foots, while this is not attempted in other instances. The oil content of the foots frequently runs up to thirty or forty-five percent, so that at times the foots contain too much oil to lend to the completed pest annihilator the desired "dry dust" properties. Five to fifteen percent oil content, say fifteen percent, has been found desirable and it is very easy to reduce the oil content of the foots by intermixture therewith of additional adsorbent, and for this purpose I prefer an adsorbent magnesium silicate having decolorizing, bleaching, filtering and like properties such as found in Nye County in the State of Nevada, that is, on the Nevada side of Death Valley.

It is sometimes desirable to chlorinate, brominate, etc. the oily foots, either partially or completely, one effect of which is to reduce the inflammable and explosive properties of the dusted material, when such material does or does not contain oxidizing agents, such for example, as peroxides, permanganates of metals, as well as many others. Furthermore, chlorinating and the like of some of the various adsorbent materials before they are used in the fining action on the oil sometimes results in increased flocculence of the resulting foots.

It has long been desired to use potassium permanganate admixed with sulphur in pest annihilators, for the reason that this combination reacts to form whatever it is that harms the pest at lower temperatures than would sulphur alone, but the fire and explosion hazard of such mixture has eliminated this combination as impracticable. However, the addition of a small amount of chlorinated oil or chlorinated oil-bearing foots eliminates this undesirable feature. Furthermore, many of the inflammable petroleum fractions that are adapted to eliminate mosquitoes, for example, are too inflammable and perhaps explosive to distribute from an airplane over high tension electrical wires. There may be other fire hazards inherent in these fractions, but they can be eliminated without impairing their larvacidal values by the addition of either or both partially or totally chlorinated oil or oil-bearing foots.

The reduction of the tendency to burn or explode, as described above with relation to specific compositions or uses, is by way of illustration and not as a limitation of the invention, since the fire and explosion hazard of many other compositions or other types of compositions may be substantially reduced or eliminated by chlorination and the like, as above referred to.

The advantages of my discovery will become further apparent on consideration of the various specific compositions and specific applications following.

A great many acres of grazing lands are infested with a variety of small right-handed snails which act as intermediate hosts for a small pest known as "Liver fluke". These flukes lay small, almost microscopic eggs which float around in the water and adhere to dry surfaces, generally a blade of grass along the bank, say of a stream, which later is eaten by the animal, that is, the beef or sheep. The egg hatches in the intestinal tract and the resulting pest works its way to and through the liver of the animal and then to the gall bladder, leaving whitish chalky tracks in the liver, the economic result of which is the condemnation of a great many beef and sheep livers, even though the balance of the carcass need not be condemned, since such infected livers are not fit for human consumption.

The entry of liver fluke eggs into the beef or sheep can be prevented by destroying the intermediate host snails, which may be accomplished by copper sulphate. Copper sulphate, however, is water-soluble and, furthermore, is heavier than water and sinks therein. The oily foots or spent clay not only floats the copper sulphate on the surface of the water, but also keeps it in the condition of a dry powdery material which is flocculent and makes it adhere to foliage and grass along the bank where the host snails abound. It thus is possible to float a copper sulphate pest annihilator on the surface of water, and it is further possible to make such annihilator adhere to foliage, and by spraying such an annihilator on the surface of the water, say a stream, the number of animal livers which need to be condemned is materially reduced, due to the fact that almost all of the copper sulphate is efficiently used for the purpose intended since the more swiftly moving water at the center of the stream will gradually push the floating dust to the more slowly moving sides where the host snails abound. It is thus possible to spray copper sulphate onto the surface of a body of water from an airplane, and it is possible for the operator of the plane to actually see which part of such surface he has already dusted, since practically all of the material floats thereon. The suspension of copper sulphate on the surface of water, where it is of maximum efficiency, is thus accomplished by my invention.

One method of preparing this mixture is to mix together the foots and fresh absorbent clay and introduce the copper sulphate in saturated aqueous solution at a boiling temperature into such dry mixture, the water then being expelled by heat and the residue disintegrated and bagged. Suitable proportions are equal parts by weight of oily foots, fresh clay, and the hot saturated aqueous solution of copper sulphate. Ten pounds of this product per acre when distributed by airplane will eliminate the host snail and the liver fluke, since one part of anhydrous copper sulphate ($CuSO_4$) in six million is sufficient to eliminate the host snail.

As high as a 92% elimination of Lygus ("Cotton Dauber") has been accomplished by substantially completely chlorinating spent clay and by substantially completely brominating an equal amount and mixing them together. It is sometimes necessary to reduce this efficiency to some extent, say about ten percent, by the addition of fresh clay as above described to obtain the desired flocculency.

By using spent clay in quantities ranging from forty percent to seventy percent, with the balance Texas brimstone, excellent results have been obtained in the control of red spider and thrips. The spent clay is introduced in a standard mill along with the crude brimstone and they are ground and mixed simultaneously.

A useful pest annihilator may be made by using a mixture of fifty percent brimstone and fifty percent spent clay as a carrier for hydrocyanic acid gas, this being useful for the control of leaf hopper.

Another composition useful in leaf hopper control may be made by preparing a package containing a mixture of about fifty percent sulphur, forty percent fresh clay, and ten percent of the oily foots of cocoanut oil refining, while another package is prepared containing calcium cyanide, the contents of the two packages being mixed in equal weights just before the pest annihilator is applied. The first package contains some moisture which aids the calcium cyanide to form cyanide gas and the oil has a tendency to absorb and hold such gas, as a result of which the hydrocyanic acid gas is more efficiently applied to the annihilation of the pest.

Paris green or copper arsenite may be used in the control of mosquito larvae that feed near the surface, according to my invention. The Paris green is introduced into the flocculent mixture of clayey foots and fresh clay as a saturated solution, the water driven off by boiling and the mass disintegrated much as in the case of copper sulphate, as described above. Other poisons may be added, such for example, as some of the cheaper phenols and here again the oily clay suspends the poisons for some time as a dust film on top of the water, no matter whether such poisons be oil-soluble or water-soluble.

Arsenical materials containing calcium, and other arsenicals are not generally adapted to airplane application, for the reason that they are fluffy and do not adhere to the crop, but fly off therefrom with the wind. By mixing therewith oily foots and fresh clay where necessary, the arsenicals are made to adhere to the vegetation that is being treated.

The effect of the oily clay on sulphur is peculiar in that it prevents the sulphur from being formed into pellets, which it does when moist and without the presence of the foots. It is thus possible to keep the sulphur moist and to prevent the formation of pellets.

The effect of applying my invention to nicotine-containing pest annihilators is likewise peculiar, in that, it seems to act as a catalyst, particularly in the presence of moisture, to make the nicotine give off pest annihilating fumes probably due to oxidation. Examples of nicotine containing annihilators consist of oily spent clay reduced to the proper flocculence with fresh clay and containing say about four parts of nicotine sulphate per one hundred of the mixed clays; and sometimes it is desirable to add sodium cyanide to such a mixture and this may be added, say in amounts of two parts per one hundred of the balance, the parts being by weight.

Another example of the application of my invention is to mix bromine residue sludge with spent clay and then mix therewith fresh clay to obtain the desired flocculence.

Again, spent and fresh clays in the proper proportions for the desired flocculence may be put into a retort and chlorine gas may be passed into the bottom thereof, and such retort may be of heat resisting material where much heat is generated by the reaction of the chlorine on the organic matter present.

Sometimes it is desirable to mix the foots from different refining processes and sometimes it is desirable to substitute mineral oil foots for all or part of the vegetable oil foots and such substitution will depend on what the particular crops being treated can tolerate.

Again, either mineral oil foots or other types of foots may be used for spraying chloropicrin or chlorine gas or bromine gas, since the oil holds these gases on the vegetation so that they may have their effect on the pests.

In all of the mixtures where the oily foots are used, it has been observed that when all of the particles which are "dry", with respect to the method of distribution, are permeated with a small amount of oil, these particles have a marked tendency to stick to the foliage, which apparently is not necessarily due entirely to the oiliness, for the reason that they seem to be given an electrical charge by the slip stream of the propeller of the airplane, so that these small particles adhere due in part to the electrical charge imparted to them, this feature being enhanced by the presence of the oil which seems to give the particle more resistance to the air than a non-oily particle.

Airplanes in dusting pest annihilators frequently fly within five feet of the foliage, and another advantage due to the use of my invention is that the oily particles rebound from the ground onto the underside of the foliage, and, therefore, cover the underside as well as the top side thereof.

Up to the time of my invention or discovery, airplanes had been limited to the distribution of four types of materials, namely, sulphur, arsenical dust, cyanide dust and dusts which are used to carry nicotine, but my invention permits the utilization of a heretofore waste product incidental to the refining of oils, in pest annihilator compositions to incorporation oil therein and/or to permit of dusting such compositions by airplanes, whereby compositions previously not distributable by airplanes may now be so distributed and applied.

In certain contact refining processes for the treatment of oil the resulting spent sorbent, saturated with oil, is known as foots; while in some of these, oil is extracted from the foots and the resulting mass is known as spent clay. By the term foots as used in the claims, I mean to include both such types of material.

I have described various specific examples of the application of my invention or discovery, but it is to be understood that the invention is not limited thereto, since such examples are given merely by way of illustration, and it now becomes obvious that many changes may be made without departing from the spirit of my invention.

Having thus described my invention, what I claim and desire to secure by Letters Patent is:

1. A composition of matter for annihilating pests, comprising a pest annihilator and oily sorption foots, said composition having characteristics, with respect to dusting, of a dry powder.

2. A composition of matter for annihilating pests, comprising a pest annihilator and oily sorption foots of oil refining, said composition having characteristics, with respect to dusting, of a dry powder.

3. A composition of matter for annihilating pests, comprising a pest annihilator and oily sorption foots of mineral oil refining, said composition having characteristics, with respect to dusting, of a dry powder.

4. A composition of matter for annihilating pests, comprising a pest annihilator and oily sorption foots of fatty ester oil refining, said composition having characteristics, with respect to dusting, of a dry powder.

5. In the method of making a composition of matter for annihilating pests, the step of mixing fresh unspent sorbent with material comprising oily sorption foots in such relative amounts that the resulting mass will contain oil and have the characteristics of a dry powder.

6. A composition of matter for annihilating pests, comprising an annihilating agent and oily sorption foots of oil refining, said composition having characteristics, with respect to dusting, of a dry powder, said composition floating on water when dusted on the surface thereof.

7. A composition of matter for annihilating pests, comprising an annihilating agent and oily sorption foots of oil refining, said composition having characteristics, with respect to dusting, of a dry powder, said composition adhering to vegetation when dusted thereon.

8. A composition of matter for annihilating pests, comprising an annihilating agent and oily sorption foots of oil refining, said composition having characteristics, with respect to dusting, of a dry powder, said composition floating on water when dusted on the surface thereof and adhering to vegetation when dusted thereon.

9. A composition of matter for annihilating pests, comprising an annihilating agent adapted to fume and oily sorption foots of oil refining, said composition having characteristics, with respect to dusting, of a dry powder, said composition floating on water when dusted on the surface thereof and adhering to vegetation when dusted thereon, said oily sorption foots lowering the fuming temperature of said annihilator.

10. A composition of matter for annihilating pests, comprising an annihilating agent, sulphur and oily carbon-sorption foots of oil refining, said composition having characteristics, with respect to dusting, of a dry powder, said composition floating on water when dusted on the surface thereof and adhering to vegetation when dusted thereon.

11. A composition of matter for annihilating pests, comprising an annihilating agent and oily sorption foots of fatty ester oil refining, said composition having characteristics, with respect to dusting, of a dry powder, said composition floating on water when dusted on the surface thereof and adhering to vegetation when dusted thereon.

GEORGE BOYD BARNHILL.